(12) United States Patent
Nakura et al.

(10) Patent No.: US 6,477,186 B1
(45) Date of Patent: Nov. 5, 2002

(54) FAST OPERATING MULTIPLEXER

(75) Inventors: Toru Nakura, Hyogo (JP); Kimio Ueda, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,666

(22) Filed: Jul. 29, 1999

(30) Foreign Application Priority Data

Mar. 26, 1999 (JP) ............................................ 11-083347

(51) Int. Cl.[7] .................................................. H04J 3/02
(52) U.S. Cl. ........................................ 370/537; 370/366
(58) Field of Search ................................. 370/366, 419, 370/463, 535, 537; 713/1; 327/403; 340/183; 341/101

(56) References Cited

U.S. PATENT DOCUMENTS 4,965,797 A * 10/1990 Yamane et al. ............. 370/537
5,200,647 A * 4/1993 Motoike ..................... 327/403
6,385,214 B1 * 5/2002 Kikuchi et al. ............. 370/537

OTHER PUBLICATIONS

"20GHz 8b Multiplexer Implemented with 0.5μm WNx/W–Gate GaAs MESFETs", by T. Seshita et al., 1994 IEEE International Solid–State Circuits Conference, pp. 172–173.

* cited by examiner

Primary Examiner—Hassan Kizou
Assistant Examiner—John Pezzlo
(74) Attorney, Agent, or Firm—McDermott, Will & Emery

(57) ABSTRACT

In a multiplexer, flip-flops for timing control are interposed between a control signal generating circuit and a four-to-one selector, and a flip-flop is interposed between a quarter divider and flip-flops provided for data input. A sum of delay times of the quarter divider and the control signal generating circuit and a setup time of the flip-flops for timing control is merely required to fall within one clock cycle, and therefore an operation speed can be high.

10 Claims, 13 Drawing Sheets

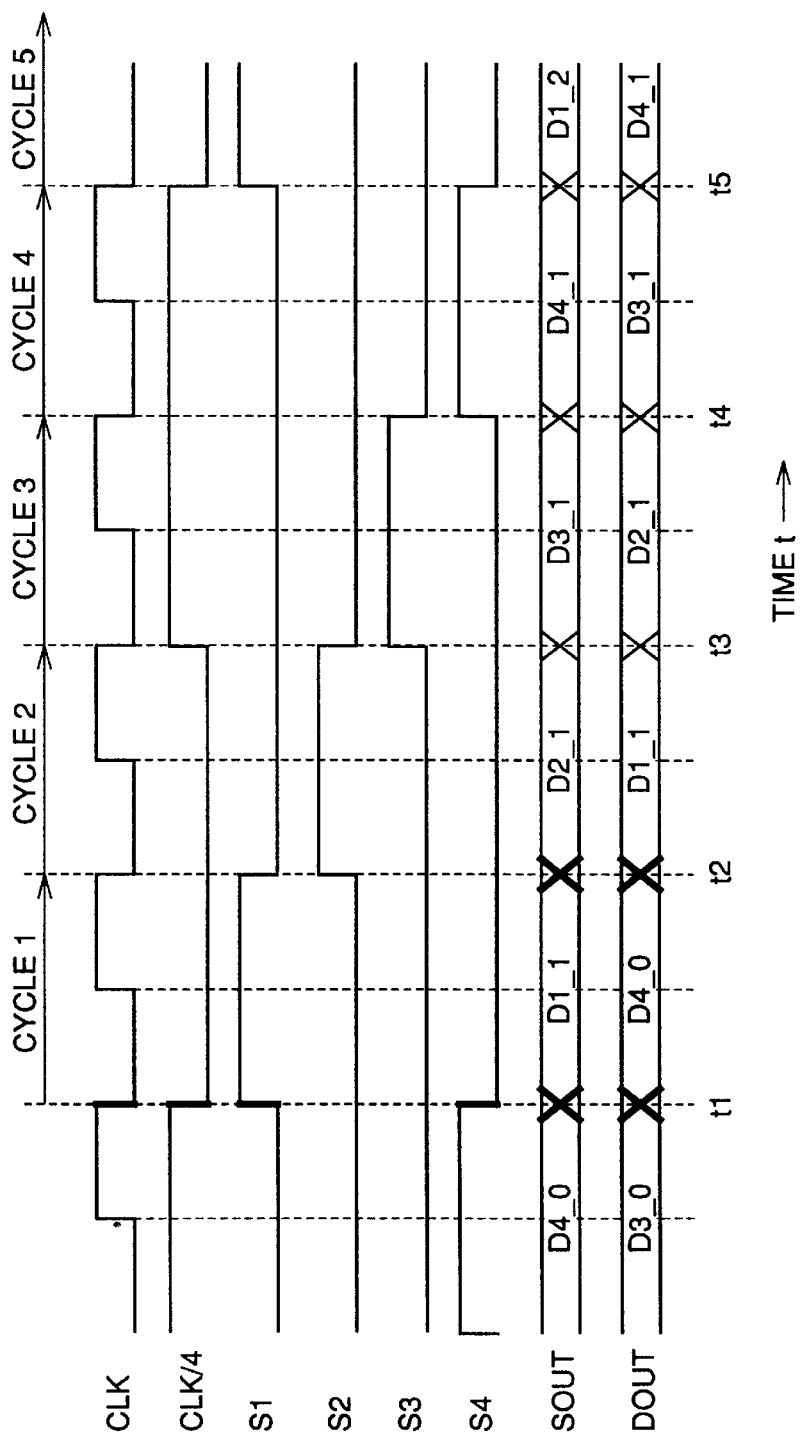

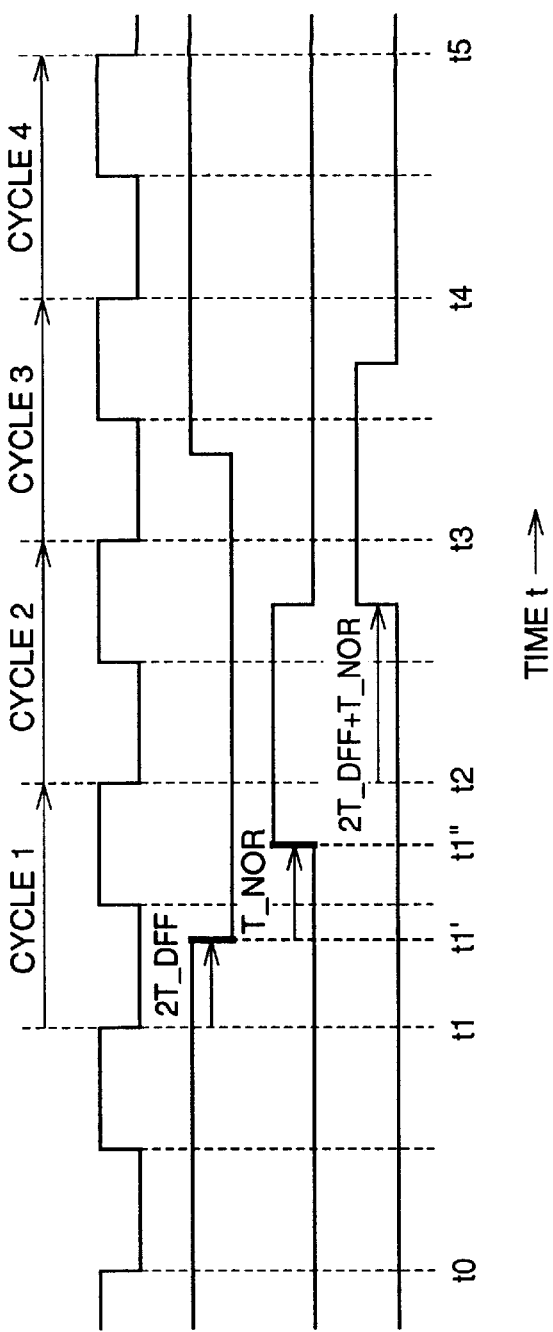

FAST OPERATING MULTIPLEXER

BACKGROUND OF THE INVENTION

1. Field of the Invention

The present invention relates to a multiplexer, and particularly a multiplexer which converts parallel data signals of multiple bits into a serial data signal of multiple bits in synchronization with a clock signal.

2. Description of the Background Art

FIG. 9 is a block diagram showing a structure of a multiplexer in the prior art. Referring to FIG. 9, the multiplexer includes a quarter divider 31, a control signal generating circuit 32, D-flip-flops 33–36 and 38, and a four-to-one selector 37.

As shown in FIG. 10, quarter divider 31 includes a D-flip-flop 41, and also include D-latches 42 and 43 which form a D-flip-flop 44. Flip-flop 41 and latch 42 are of a negative edge type, and therefore issue data in response to a falling edge of a clock signal. Latch 43 is of a positive edge type, and therefore issues data in response to the rising edge of clock signal.

Flip-flop 41 receives clock signal CLK on its clock terminal C, and have an output terminal Q and an inverted output terminal QB which are connected to an inverted input terminal DB and an input terminal D, respectively. Accordingly, flip-flop 41 issues from its output terminal Q a clock signal CLK/2, which has half a frequency of clock signal CLK, and is inverted upon every falling of clock signal CLK.

Clock signal CLK/2 is applied to clock terminals C of latches 42 and 43. Output terminal Q and inverted output terminal QB of latch 42 are connected to input terminal D and inverted input terminal DQ of latch 43, respectively. Output terminal Q and inverted output terminal QB of latch 43 are connected to inverted input terminal DB and input terminal D of latch 42, respectively. Accordingly, latches 42 and 43 issue clock signals $\phi 1$–$\phi 4$, which have four phases shifted from each other by ¼ of their period, respectively, and each have a frequency equal to ¼ of that of clock signal CLK. Clock signals $\phi 1$–$\phi 4$ are supplied to control signal generating circuit 32. Output signal $\phi 2$ (CLK/4) of latch 43 is applied to clock terminals C of flip-flops 33–36.

Control signal generating circuit 32 includes four NOR gates 51–54 and four NAND gates 55–58. Each of NOR gates 51–54 receives signals of two phases among clock signals $\phi 1$–$\phi 4$, and issues corresponding one of control signals S1–S4. Each of NAND gates 55–58 receives signals of two phases among clock signals $\phi 1$–$\phi 4$, and issues corresponding one of control signals S1B–S4B. Control signals S1–S4 have frequencies equal to that of clock signal CLK/4, and successively attain "H" level for ¼ of the period. Signals S1B–S4B are inverted signals of signals S1–S4, respectively. Control signals S1–S4 and S1B–S4B are applied to four-to-one selector 37. In FIG. 9, signals S1B–S4B are not shown for simplicity reason.

Flip-flops 33–36 receive data D1–D4 on their input terminals D, and also receive clock signal CLK on their clock terminals C, respectively. Flip-flops 33–36 are of the negative edge type, and issue input data D1–D4 in response to the falling edge of clock signal CLK/4. Output data D1'–D4' of flip-flops 33–36 are applied to four-to-one selector 37.

Four-to-one selector 37 includes, as shown in FIG. 11, four input nodes N1–N4, four transfer gates 61–64 and an output node N5. Four input nodes N1–N4 are supplied with output data D1'–D4' of flip-flops 33–36, respectively. Transfer gates 61–64 are connected between input nodes N1–N4 and output node N5, respectively, and are turned on in response to the states that control signals S1–S4 attain "H" level and control signals S1B–S4B attain "L" level, respectively. Accordingly, data D1'–D4' are issued to output node N5 in response to the states that control signals S1–S4 attain "H" level and control signals S1B–S4B attain "L" level, respectively.

An output data SOUT of selector 37 is supplied to input terminal D of flip-flop 38, which also receives clock signal CLK on its clock terminal C. Flip-flop 38 is of a negative edge type, and issues input data SOUT in response to the falling edge of clock signal CLK. The output data of flip-flop 38 forms output data DOUT of this multiplexer.

FIGS. 12A–12H are time charts showing operations of the multiplexer shown in FIGS. 9 to 11. Quarter divider 31 produces a clock signal CLK/4 having a period four times larger than that of clock signal CLK. Clock signal CLK/4 is applied to clock terminals C of flip-flops 33–36. Flip-flops 33–36 continuously issue the same data D1'–D4' for one period of clock signal CLK/4 (during cycles 1 to cycle 4 in FIG. 12).

Quarter divider 31 produces four clock signals $\phi 1$–$\phi 4$ which have the same frequencies as clock signal CLK/4, and also have phases shifted from each other by a quarter of the period. Clock signals $\phi 1$–$\phi 4$ are applied to control signal generating circuit 32. Control signals generating circuit 32 produces control signals S1–S4 which attain "H" level in cycles 1–4, respectively, as well as inverted signals S1B–S4B of them, and applies signals S1–S4 and S1B–S4B to a selector 37.

Transfer gates 61–64 of selector 37 are turned on during cycles 1–4 in accordance with S1 and S1B, . . . , and S4 and S4B, respectively. Accordingly, data D1_1–D4_1 corresponding to data D1'–D4' are issued in serial from output node N5 of selector 37 to flip-flop 38 at every clock cycle, respectively.

Flip-flop 38 issues input data D1_1–D4_1 in response to the falling edges of cycles 2 to 5, respectively. In this manner, slow parallel data D1–D4 are converted into fast serial data D1_1–D4_4.

FIGS. 12A–12H are time charts showing the operations in the case where each circuit included in the multiplexer does not have a delay time. However, each circuit included in the multiplexer practically has a delay time. Since quarter divider 31 has two flip-flops 41 and 44, quarter divider 31 has the delay time of 2T_DFF equal to double the delay time T_DFF of each flip-flop. As shown in FIGS. 13A–13D, therefore, the phase of dock signal CLK_4 is delayed by 2T_DFF from clock signal CLK.

The delay time of control signal generating circuit 32 is equal to a delay time T_NOR of an NOR gate because the delay time of the NOR gate is generally longer than that of an NAND gate. Accordingly, the phases of control signals S1–S4 are delayed from clock signal CLK by (2T_DFF+T_NOR).

Assuming that selector 37 has a delay time of T_sel, a time of (2T_DFF+T_NOR+T_sel) is required from the input of clock signal CLK to the output from selector 37, and a setup time T_setup of flip-flop 38 is required for taking in output data SOUT of selector 37 into flip-flop 38. Therefore, a time of (2T_DFF+T_NOR+T_sel+T_setup) must fall within one clock cycle.

Accordingly, the multiplexer suffers from a problem that the maximum operation frequency fmax is restricted to or below the following value:

$$\text{fmax} = 1/(2T\_DFF + T\_NOR + T\_sel + T\_setup) \qquad (1)$$

SUMMARY OF THE INVENTION

Accordingly, a major object of the invention is to provide a fast-operating multiplexer, i.e., a multiplexer which can operate fast.

According to an aspect of the invention, a multiplexer includes a signal generating circuit for generating control signals of M phases, a first holding circuit for temporarily holding the control signals of M phases, and thereafter issuing the control signals in synchronization with a clock signal, a select circuit for converting parallel data signals of M bits into a serial data signal of M bits in response to the control signals of M phases, and a second holding circuit for temporarily holding each of output signals of the select circuit, and thereafter issuing the output signal of the select circuit in synchronization with the clock signal. Accordingly, it is merely required that a sum of a delay time of the signal generating circuit and a setup time of the first holding circuit falls within one clock cycle. Therefore, the operation speed can be higher than that in the prior art not provided with the first holding circuit.

Preferably, the signal generating circuit includes an internal clock generating circuit for producing internal clock signals of M phases, and a logic circuit for producing the control signals of M phases based on the internal clock signals of M phases. Each of the control signals is at a first level during (1/M) of one period, and is at a second level during (M−1)/M of one period. This allows easy production of the control signals of M phases, and thus allows easy control of the select circuit.

More preferably, the multiplexer further includes a third holding circuit for temporarily holding the internal clock signals of M phases issued from the internal clock generating circuit, and issuing the internal clock signals to the logic circuit in synchronization with the clock signal. In this case, it is merely required that a sum of the delay times of the third holding circuit and the logic circuit and the setup time of the first holding circuit fall within one clock cycle. Accordingly, the operation speed can be further increased.

Preferably, the multiplexer further includes a first delay circuit for delaying the clock signal. The first and second holding circuits operate in synchronization with the clock signal delayed by the first delay circuit. In this case, timing margins before and after the signal generating circuit can be increased so that the operation speed can be further increased.

Preferably, the multiplexer further includes first and second delay circuits for delaying the clock signal. The first holding circuit operates in synchronization with the clock signal delayed by the first delay circuit, and the second holding circuit operates in synchronization with the clock signal delayed by the first and second delay circuits. In this case, timing margins before and after the select circuit can be increased so that the operation speed can be further increased.

Preferably, the multiplexer further includes first, second and third delay circuits for delaying the clock signal. The third holding circuit operates in synchronization with the clock signal delayed by the first delay circuit. The first holding circuit operates in synchronization with the clock signal delayed by the first and second delay circuits. The second holding circuit operates in synchronization with the clock signal delayed by the first to third delay circuits. In this case, it is possible to increase the timing margins before and after the internal clock generating circuit so that the operation speed can be further increased.

According to another aspect of the invention, a device includes a first signal converting circuit for converting parallel data signals of (M×N) bits into first to Mth parallel data signal columns, and a second signal converting circuit for converting the first to Mth parallel data signal columns into a serial data signal of (M×N) bits. The second signal converting circuit includes a first signal generating circuit for producing first control signals of M phases, a first holding circuit for temporarily holding the first control signals of M phases, and thereafter issuing the first control signals in synchronization with the clock signal, a first select circuit for converting the first to Mth parallel data signal columns into a serial data signal of (M×N) bits in response to the first control signals of M phases, and a second holding circuit for temporarily holding each of the output data signals of the first select circuit, and thereafter issuing the output data signal of the first select circuit in synchronization with the clock signal. Accordingly, it is merely required that the sum of the delay time of the first signal generating circuit and the setup time of the first holding circuit fall within one clock cycle. Therefore, the operation speed can be faster than that in the prior art not provided with the first holding circuit. Between the first and second signal generating circuits, only the second signal generating circuit is required to operate fast, and the first holding circuit is added only to this second signal generating circuit. Therefore, increase in power consumption can be minimized.

Preferably, the first signal generating circuit includes an internal clock generating circuit for producing internal clock signals of M phases, and a logic circuit for producing the first control signals of M phases based on the internal clock signals of M phases. Each of the first control signals is at a first level during (1/M) of one period, and is at a second level during (M−1)/M of one period. This allows easy production of the first control signals of M phases, and thus allows easy control of the first select circuit.

More preferably, the multiplexer further includes a third holding circuit for temporarily holding the internal clock signals of M phases issued from the internal clock generating circuit, and issuing the internal clock signals to the logic circuit in synchronization with the clock signal. In this case, it is merely required that a sum of the delay times of the third holding circuit and the logic circuit and the setup time of the first holding circuit fall within one clock cycle. Accordingly, the operation speed can be further increased.

Preferably, the internal clock signal of one phase among the internal clock signals of M phases is selected as a reference clock signal, and the first signal converting circuit includes a second signal generating circuit for producing second control signals of N phases, a fourth holding circuit for temporarily holding the second control signals of N phases, and thereafter issuing the second control signal in synchronization with the reference clock signal, a second select circuit for converting the parallel data signals of (M×N) bits into the first to Mth parallel data signal columns in response to the second control signal of the N phases, and a fifth select circuit for temporarily holding each data signal of the second select circuit at a time, and thereafter issuing the held output data signal in synchronization with the clock signal. Therefore, it is merely required that a sum of the delay time of the second signal generating circuit and the setup time of the fourth holding circuit fall within M clock cycles. Accordingly, the operation speed can be higher than that in the prior art not provided with a fourth holding circuit.

The foregoing and other objects, features, aspects and advantages of the present invention will become more

BRIEF DESCRIPTION OF THE DRAWINGS

FIGS. 12A–12H are time charts showing operations of the multiplexer shown in FIG. 9; and FIGS. 13A–13D are time charts showing a problem of the multiplexer shown in FIG. 9.

DESCRIPTION OF THE PREFERRED EMBODIMENTS

First Embodiment

Figure 1:
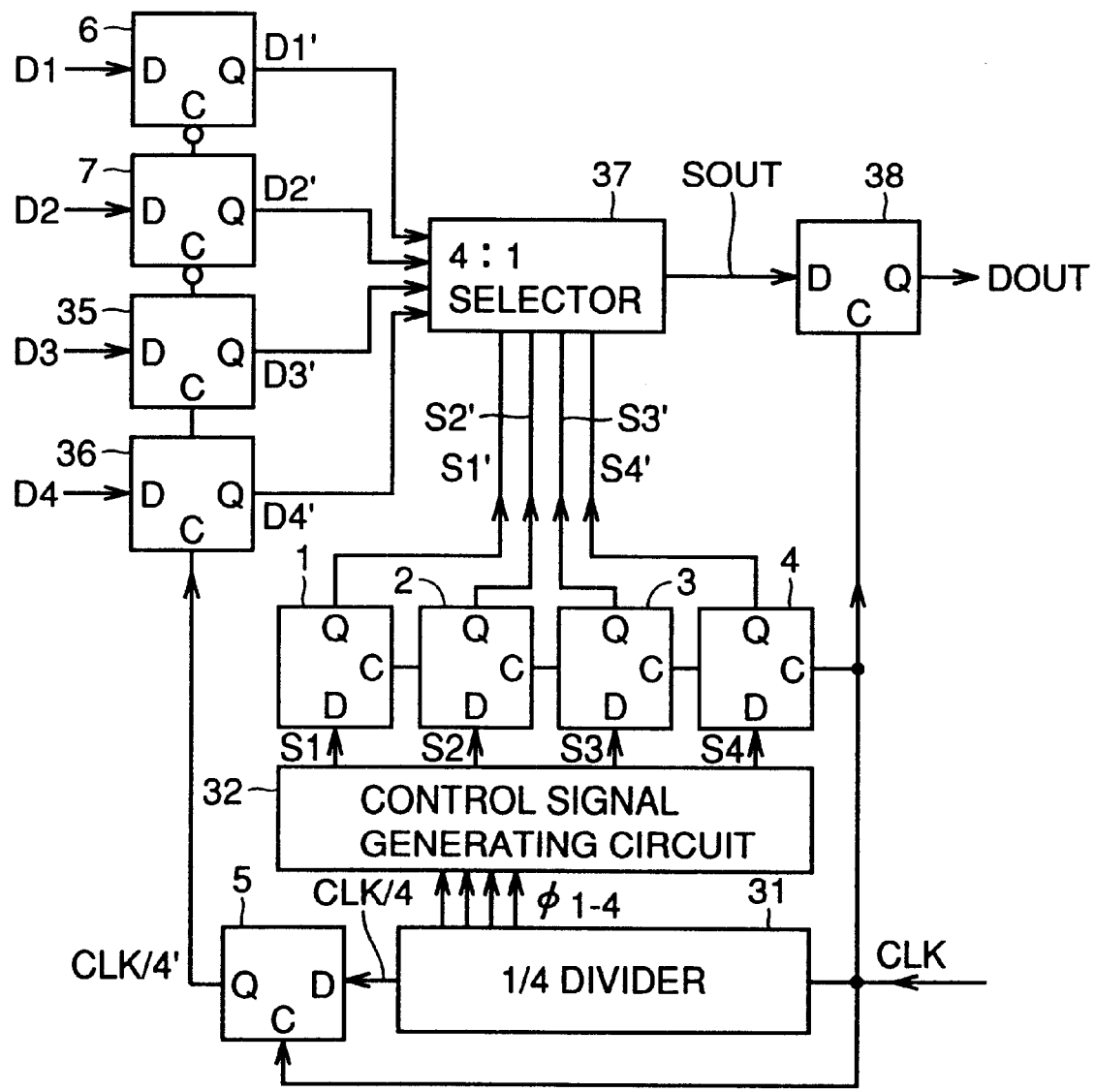
FIG. 1 is a block diagram showing a structure of a multiplexer according to a first embodiment of the invention.
Figure 2:
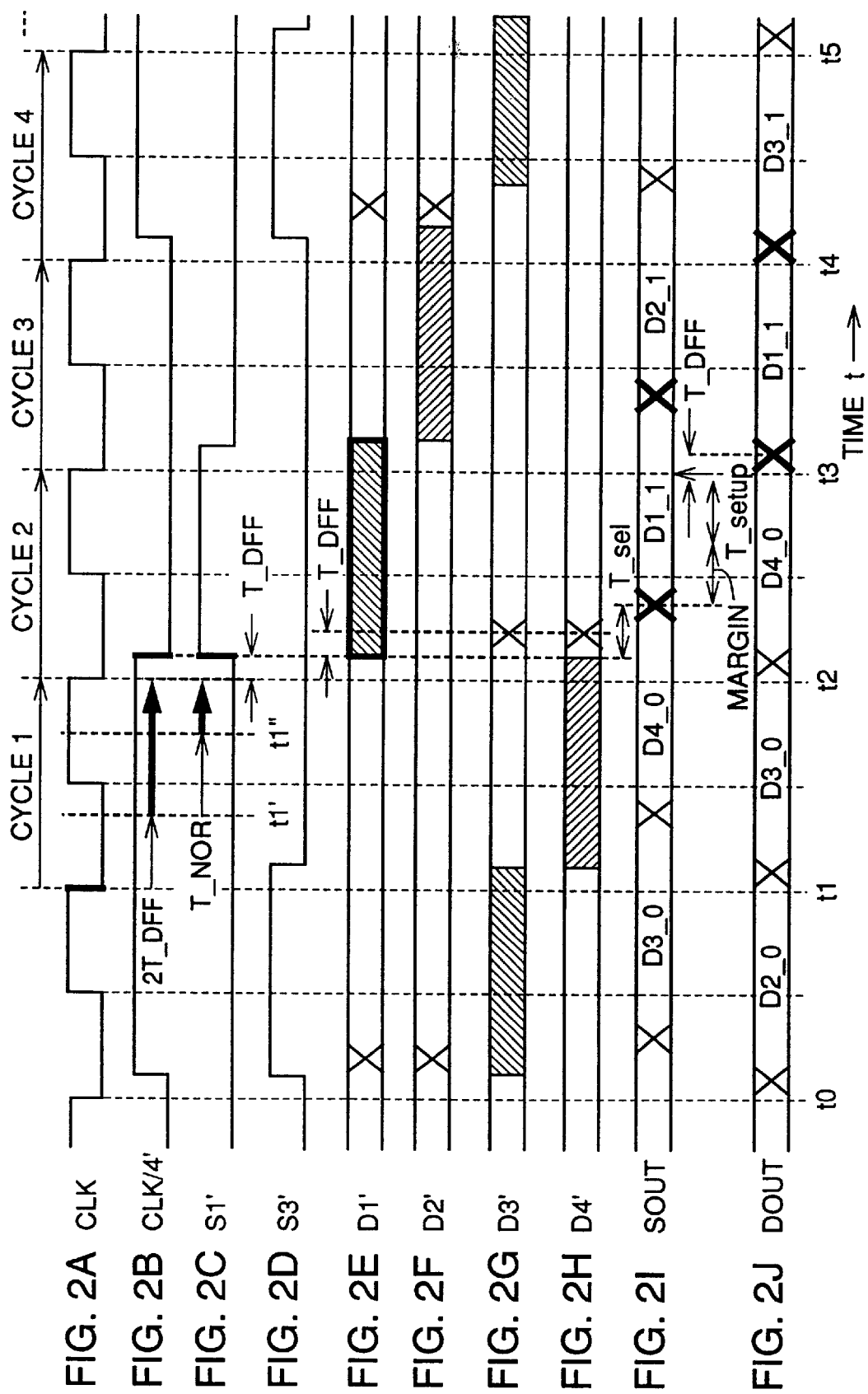
FIGS. 2A–2J are time charts showing operations of the multiplexer shown in FIG. 1.
Figure 9:
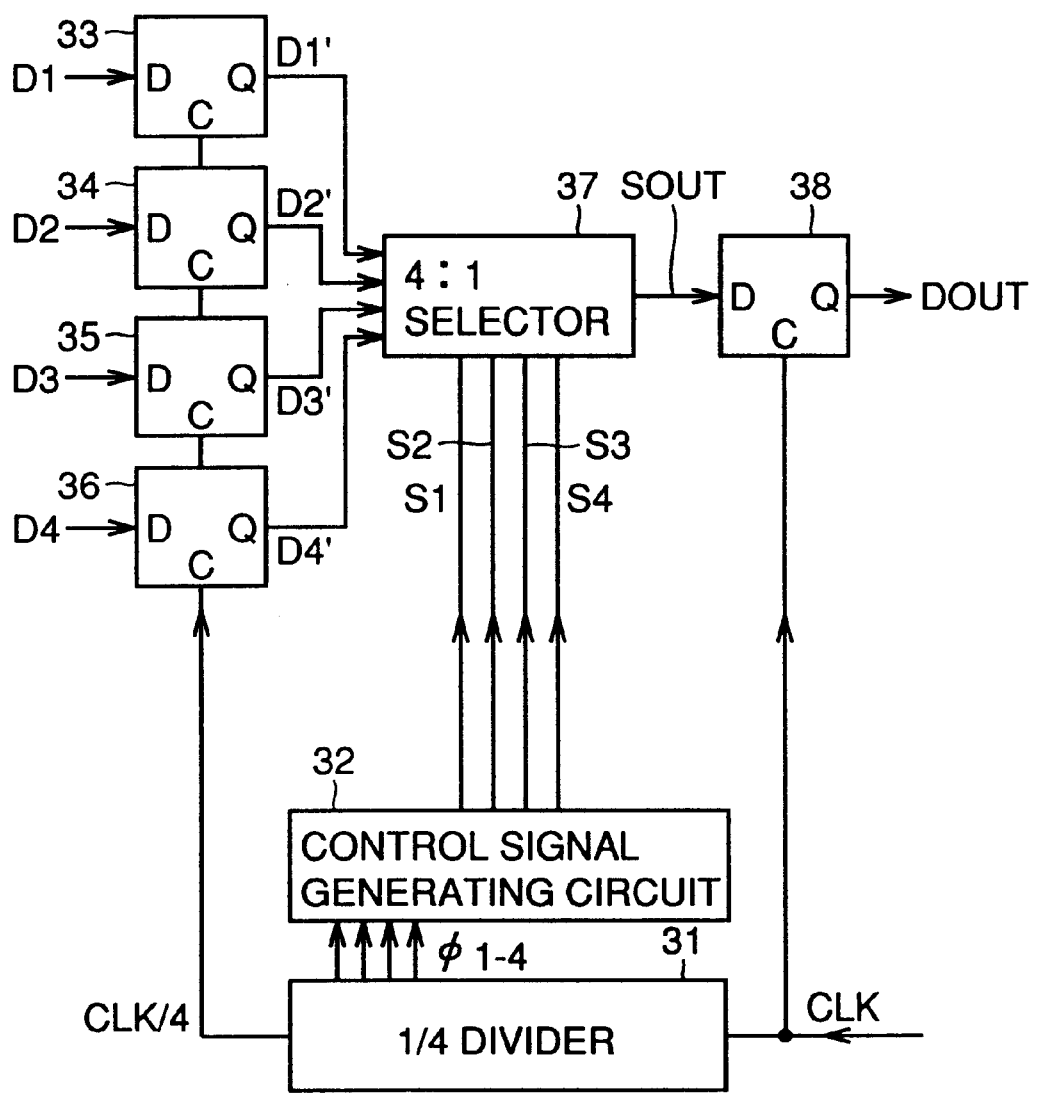
FIG. 9 is a block diagram showing a structure of a conventional multiplexer.
Figure 10:
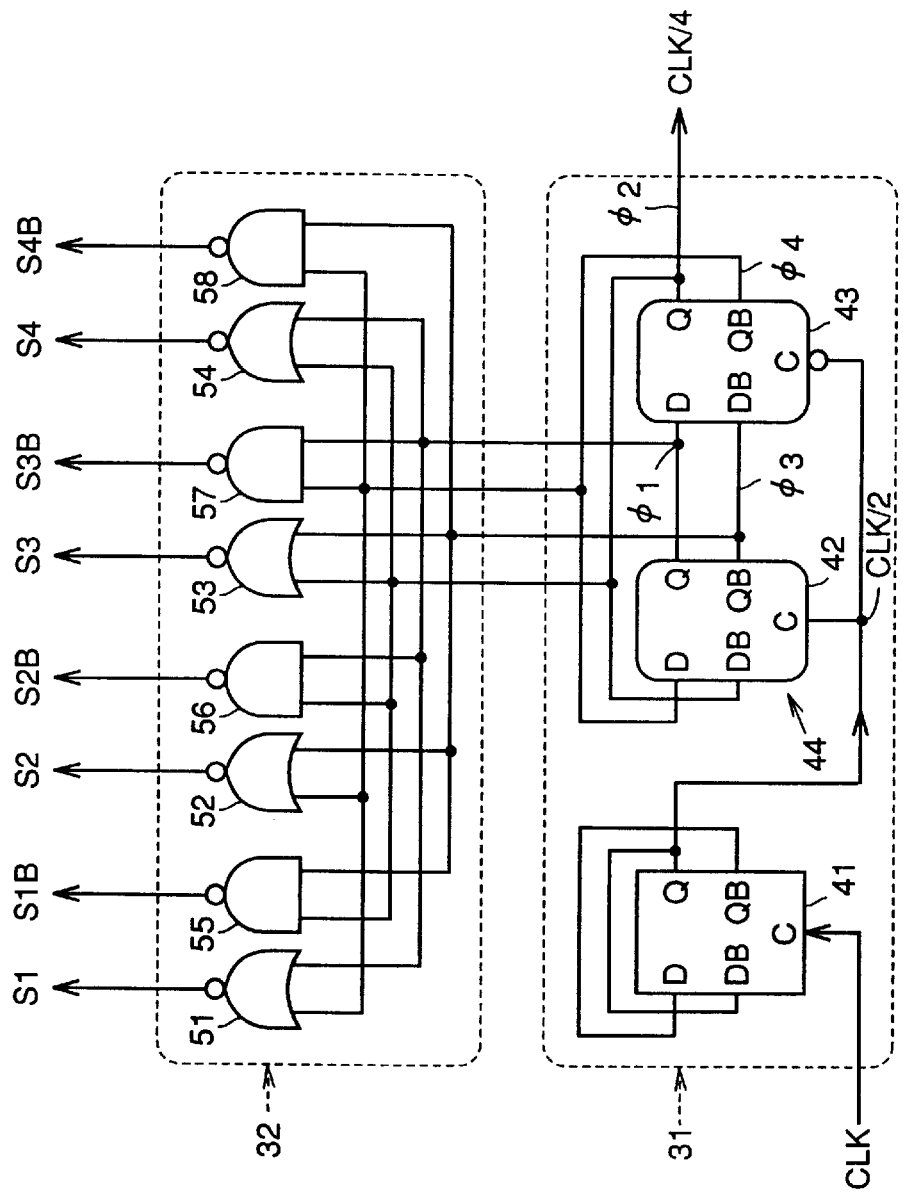
FIG. 10 is a circuit block diagram showing structures of a quarter divider and a control signal generating circuit shown in FIG. 9.
Figure 11:
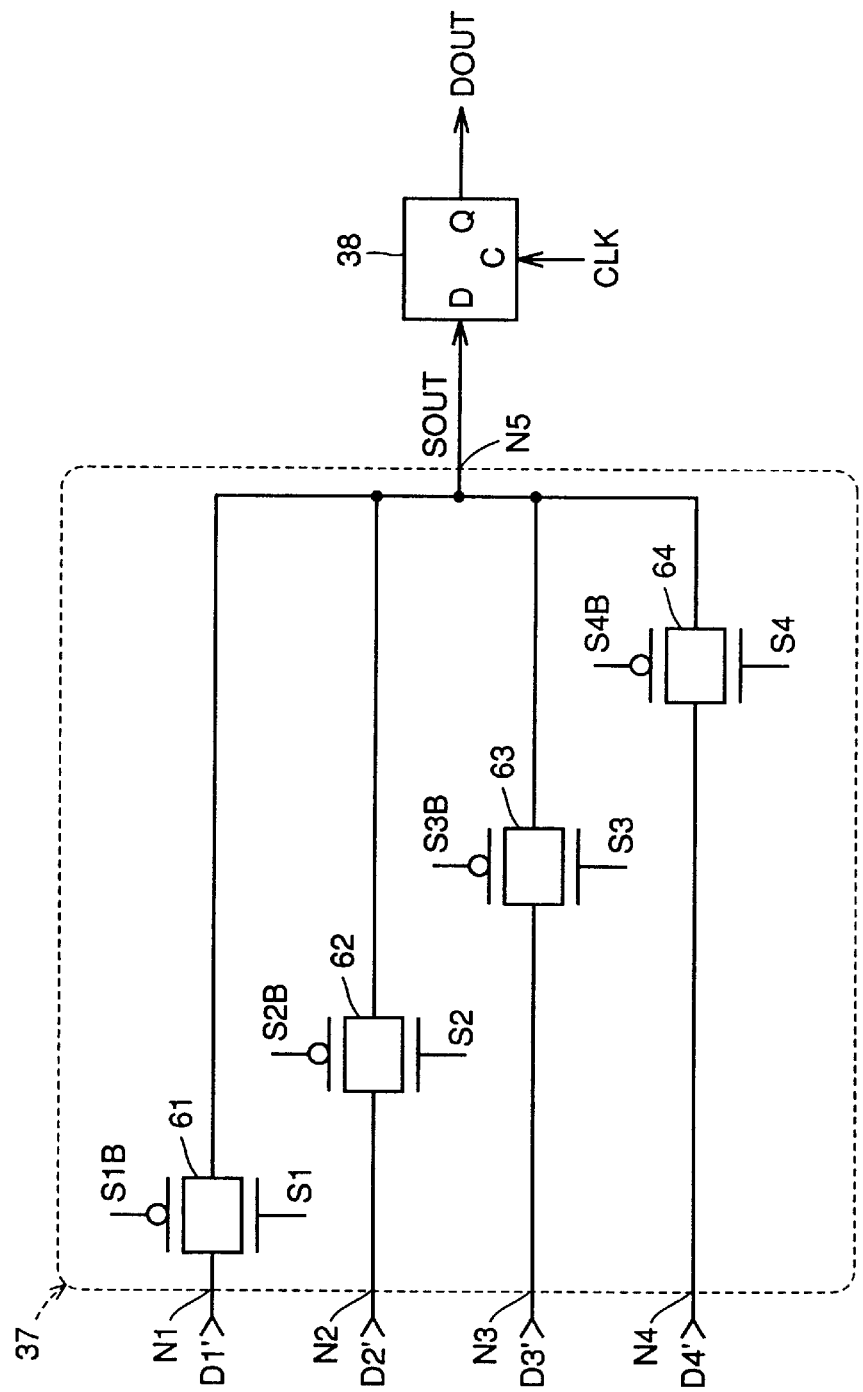
FIG. 11 is a circuit diagram showing a structure of a four-to-one selector shown in FIG. 9.

FIG. 1 is a block diagram showing a structure of a multiplexer according to a first embodiment of the invention, and is comparable with FIG. 9;

Referring to FIG. 1, a multiplexer in this figure differs from the multiplexer shown in FIG. 9 in that D-flip-flops 1–4 are interposed between control signal generating circuit 32 and four-to-one selector 37, D-flip-flops 6 and 7 of the positive edge type are employed in place of D-flip-flops 33 and 34, and a D-flip-flop 5 is interposed between quarter divider 31 and clock terminals C of flip-flops 6, 7, 35 and 36.

D-flip-flops 1–4 are supplied with control signals S1–S4 on their input terminals D, respectively. Flip-flops 1–4 issue the levels of control signals S1–S4, as they are, in response to the falling edge of clock signal CLK, respectively. Output signals S1'–S4' of flip-flops 1–4 are applied to four-to-one selector 37 instead of control signals S1–S4, respectively.

D-flip-flop 5 is supplied on its input terminal D with clock signal CLK/4 produced by quarter divider 31. D-flip-flop 5 is supplied on its clock terminal C with clock signal CLK. Flip-flop 5 issues the level of clock signal CLK/4, as it is, in response to the falling edge of clock signal CLK. An output signal CLK/4' of flip-flop 5 is applied to clock terminals C of flip-flops 6, 7, 35 and 36 instead of clock signal CLK/4.

D-flip-flops 6 and 7 issue input data D1 and D2, as they are, in response to the rising edge of clock signal CLK/4'. The reason for which flip-flops 33 and 34 are replaced with flip-flops 6 and 7 of the positive edge type is to cause switching of data D1'–D4' prior to switching of four-to-one selector 37.

Structures other than the above are the same as those of the multiplexer in FIG. 9. In practice, four D-flip-flops for control signals S1B–S4B are interposed between control signal generating circuit 32 and four-to-one selector 37, but are not shown in the figure for simplicity reason.

FIGS. 2A–2J are time charts showing operations of the multiplexer shown in FIG. 1. Quarter divider 31 produces clock signal CLK/4 having the period four times larger than that of clock signal CLK. Clock signal CLK/4 delays clock signal CLK by delay time of 2T_DFF of quarter divider 31. Clock signal CLK/4 is changed into clock signal CLK/4' by flip-flop 5 which controls the timing of clock signal CLK. Clock signal CLK/4' is delayed from clock signal CLK by one clock cycle and delay time T_DFF of flip-flop 5.

Clock signal CLK/4' is applied to clock terminals C of flip-flops 6, 7, 35 and 36. Flip-flops 6 and 7 issue input data D1 and D2, as they are, in response to the falling edge of clock signal CLK/4'. Flip-flops 35 and 36 issue input data D3 and D4, as they are, in response to the falling edge of clock signal CLK/4'. Output data D1'–D4' of flip-flops 6, 7, 35 and 36 are applied to four-to-one selector 37.

Quarter divider 31 produces clock signals $\phi1$–$\phi4$. Clock signals $\phi1$–$\phi4$ are delayed from clock signal CLK by delay time 2T_DFF of quarter divider 31. Clock signals $\phi1$–$\phi4$ are applied to control signal generating circuit 32. Control signal generating circuit 32 produces control signals S1–S4 which successively attain "H" level at every clock cycle. Control signals S1–S4 are delayed from clock signal CLK by delay time 2T_DFF of quarter divider 31 and delay time T_NOR of control signal generating circuit 32. Control signals S1–S4 are changed into control signals S1'–S4' by flip-flops 1–4 which change the timing thereof, respectively. Control signals S1'–S4' are delayed from clock signal CLK by one clock cycle and delay times T_DFF of flip-flops 1–4, respectively.

In selector 37, transfer gates 61–64 are turned on in response to "H" level of control signals S1'–S4', respectively. Accordingly, data D1_1–D4_1 corresponding to data D1'–D4' are serially issued at every clock cycle. Data D1_1–D4_1 are delayed from control signals S1'–S4' by the delay time of four-to-one selector 37. Output data SOUT of selector 37 is sent to flip-flop 38.

Flip-flop 38 issues input data D1_1–D4_1 in response to the falling edges in cycles 3–6, respectively. In this manner, slow parallel data D1–D4 are converted into fast serial data D1_1–D4_1.

In this multiplexer, a time of (2T_DFF+T_NOR) is required from input of clock signal CLK to output of control signals S1–S4, and a setup time T setup of flip-flops 1–4 is required for taking control signals S1–S4 into flip-flops 1–4. Therefore, (2T_DFF+T_NOR+T_setup) must fall in one clock cycle.

A time of (T_DFF+T_sel) is required from the output of control signals S1–S4 to the output of selector 37, and setup time T_setup of flip-flop 38 is required for taking in the output of selector 37 into flip-flop 38. Therefore, (T_DFF+T_sel+T_setup) must fall in one clock cycle.

Accordingly, the maximum operation frequency of the multiplexer takes on smaller one between fmax2 and fmax3 expressed by the following formulas (2) and (3), respectively.

$$\text{fmax2}=1/(T\_\text{DFF}+T\_\text{sel}+T\_\text{setup}) \qquad (2)$$

$$\text{fmax3}=1/(2T\_\text{DFF}+T\_\text{NOR}+T\_\text{setup}) \qquad (3)$$

In many cases, this multiplexer exhibits a relationship of fmax3<fmax2, and the maximum operation frequency is restricted to fmax 3, although these facts depend on the performance of transistors forming the circuit. However, fmax3 is larger than fmax1 so that the maximum operation frequency is higher than that of the conventional multiplexer shown in FIG. 9.

In this embodiment, flip-flops 33 and 34 of the negative edge type are replaced with flip-flops 6 and 7 of the positive edge type so that the switching of data D1'–D4' precedes the switching in selector 37. However, the replacement is not essential, and the switching of data D1'–D4' may be performed simultaneously with the switching in selector 37.

Flip-flops 1–5, 35, 36 and 38 of the negative edge type may be replaced with flip-flops of the positive edge type, respectively, and flip-flops 6 and 7 of the positive edge type may be replaced with flip-flops of the negative edge type.

Although this embodiment employs the multiplexer of the four-to-one type, the invention can be effectively applied to the multiplexers of M-to-1 type where M is an integer larger than 1.

Second Embodiment

Figure 3:
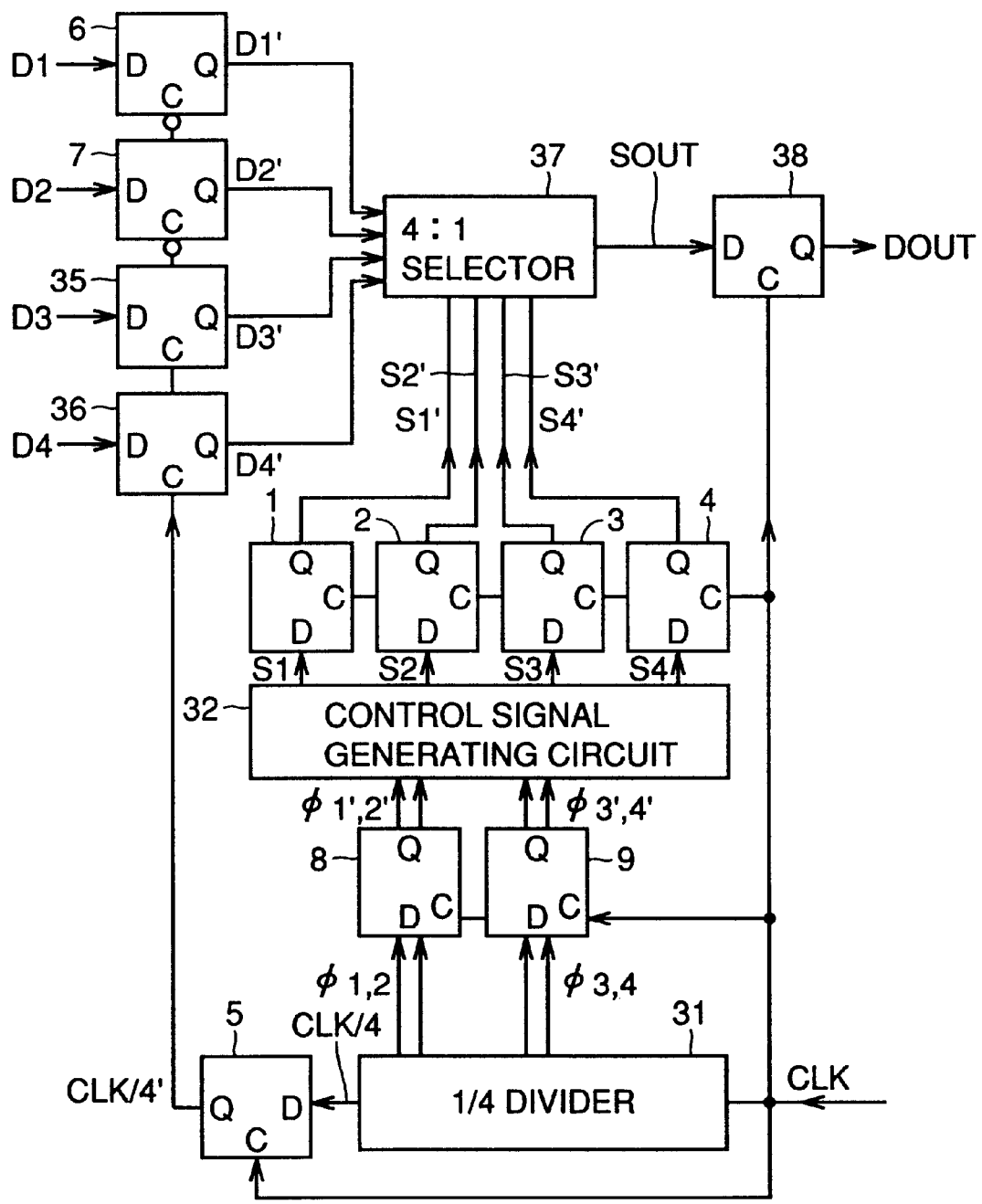
FIG. 3 is a block diagram showing a structure of a multiplexer according to a second embodiment of the invention.

FIG. 3 is a block diagram showing a structure of a multiplexer according to a second embodiment of the invention. The multiplexer in FIG. 3 differs from the multiplexer in FIG. 1 in that D-flip-flips 8 and 9 of 2 bits are interposed between quarter divider 31 and control signal generating circuit 32.

Flip-flop 8 receives clock signals $\phi1$ and $\phi2$ on its two input terminals, respectively. Flip-flop 9 receives clock signals $\phi3$ and $\phi4$ on its two input terminals, respectively. Flip-flops 8 and 9 receive clock signal CLK on their clock terminals C. Flip-flops 8 and 9 issue the levels of clock signals $\phi1$–$\phi4$, as they are, in response to the rising edge of clock signal CLK. Instead of clock signals $\phi1$–$\phi4$, output signals $\phi1'$–$\phi4'$ of flip-flops 8 and 9 are applied to control signal generating circuit 32. Structures other than the above are the same as those of the multiplexer shown in FIG. 1, and therefore will not be described.

In this multiplexer, a time of 2T_DFF is required from the input of clock signal CLK to the output of quarter divider 31, and setup time of T_setup of flip-flops 8 and 9 is required for taking clock signals $\phi1$–$\phi4$ into flip-flops 8 and 9. Therefore, (2T_DFF+T_setup) must fall within one clock cycle.

Further, a time of (T_DFF+T_NOR) is required from the output of quarter divider 31 to the output of control signal generating circuit 32, and setup time of T_setup of flip-flops 1–4 are required for taking control signals S1–S4 into flip-flops 1–4, respectively, so that (T_DFF+T_NOR+T_setup) must fall within one clock cycle.

Accordingly, the maximum operation frequency of this multiplexer is equal to the smallest one among foregoing fmax2 expressed by the formula (2) as well as fmax4 and fmax5 expressed by the following formulas (4) and (5), respectively.

$$\text{fmax4}=1/(T\_\text{DFF}+T\_\text{NOR}+T\_\text{setup}) \qquad (4)$$

$$\text{fmax5}=1/(2T\_\text{DFF}+T\_\text{setup}) \qquad (5)$$

In many cases, the above multiplexer establishes a relationship of (fmax4<fmax2<fmax5), and the maximum operation frequency is restricted to fmax4, although these facts depend on the performance of transistors forming the circuit. However, fmax4 is larger than fmax3, and the maximum operation frequency is higher than that of the multiplexer shown in FIG. 1.

Third Embodiment

Figure 4:
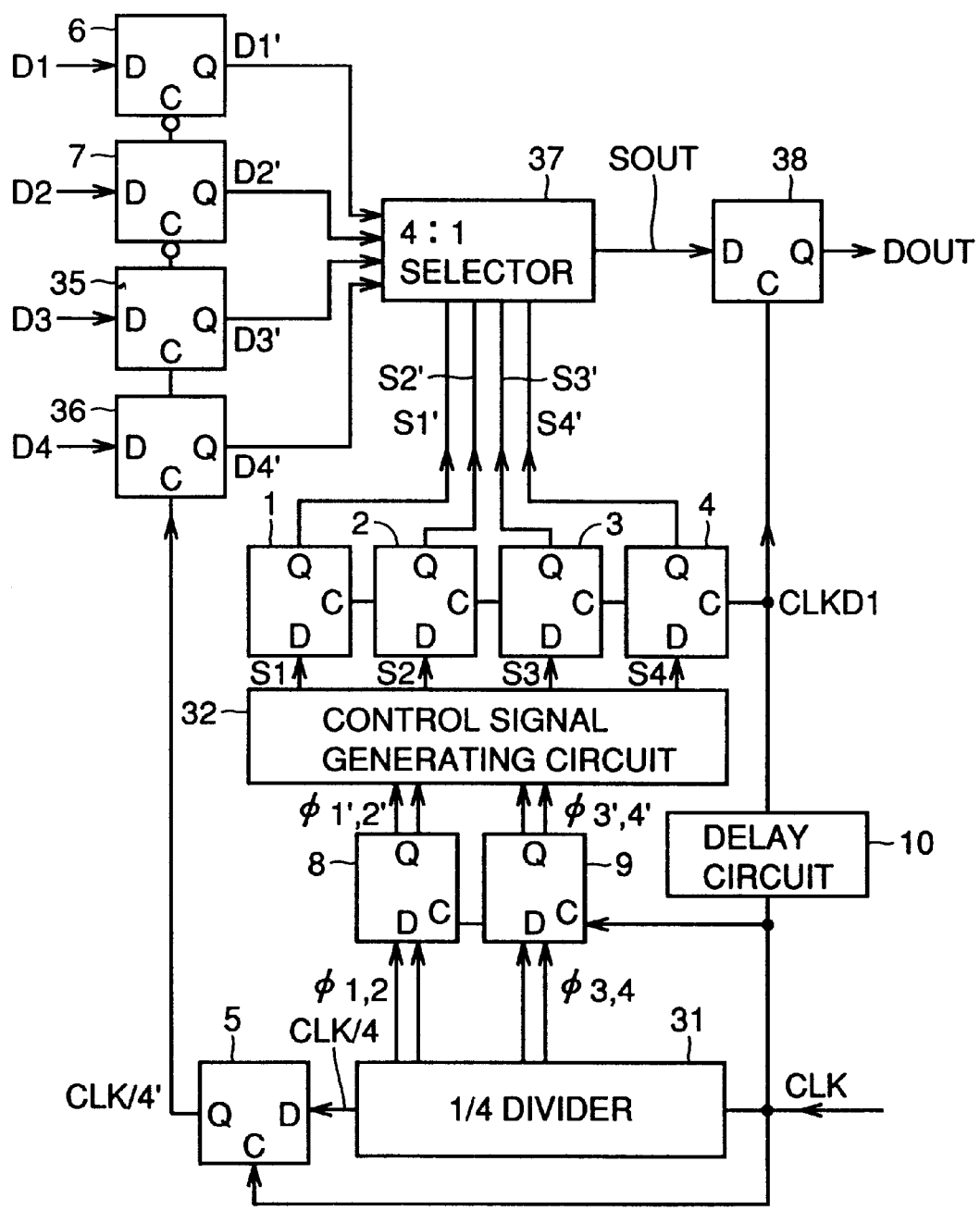
FIG. 4 is a block diagram showing a structure of a multiplexer according to a third embodiment of the invention.

FIG. 4 is a block diagram showing a structure of a multiplexer according to a third embodiment of the invention. Referring to FIG. 4, the multiplexer differs from the multiplexer shown in FIG. 3 in that a delay circuit 10 is additionally employed.

Delay circuit 10 delays clock signal CLK by a predetermined time T_D1, and thereby produces a clock signal CLKD1. Flip-flops 8 and 9 receive clock signal CLK on their clock terminals C. Flip-flops 1–4 and 38 receive clock signal CLKD1 on their clock terminals C.

In this multiplexer, the data output timing of flip-flops 1–4 is delayed by T_D1, and the timing margin from flip-flops 8 and 9 to flip-flops 1–4 is increased. Therefore, fmax4 can be increased to fmax4' expressed by the following formula (6):

$$\text{fmax4'}=1/(T\_\text{DFF}+T\_\text{NOR}+T\_\text{setup}-T\_\text{D1})<1/T\_\text{setup} \qquad (6)$$

where a relationship of (T_D1<T_DFF+T_NOR) is present.

In many cases, the above multiplexer establishes a relationship of (fmax2<fmax5<fmax4'), and the maximum operation frequency is restricted to fmax2, although these facts depend on the performance of transistors forming the circuit. However, fmax2 is larger than fmax4, and the maximum operation frequency is higher than that of the multiplexer shown in FIG. 3.

Fourth Embodiment

Figure 5:
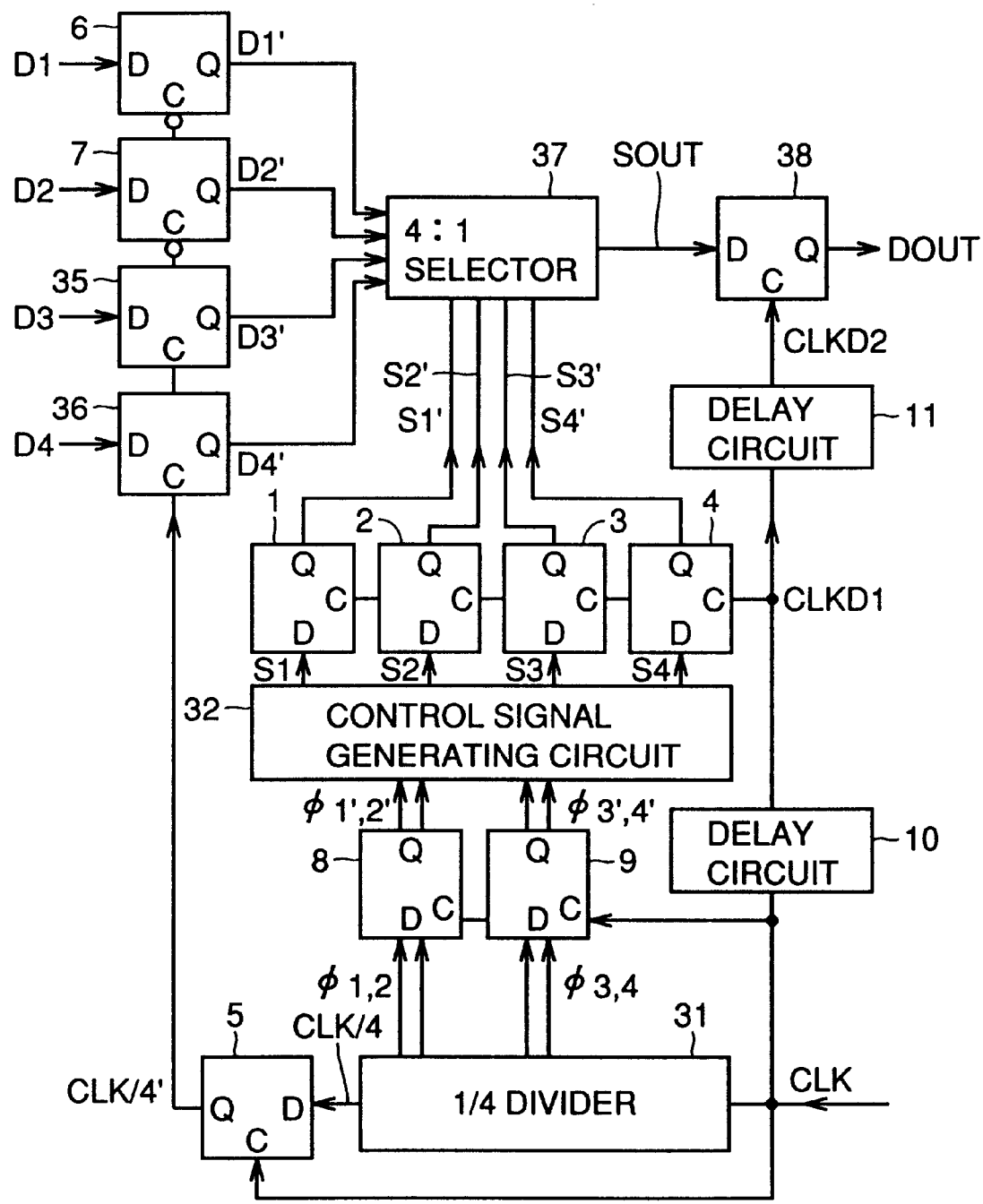
FIG. 5 is a block diagram showing a structure of a multiplexer according to a fourth embodiment of the invention.

FIG. 5 is a block diagram showing a structure of a multiplexer according to a fourth embodiment of the invention. Referring to FIG. 5, the multiplexer differs from the multiplexer shown in FIG. 4 in that a delay circuit 11 is additionally employed.

Delay circuit 11 delays clock signal CLKD1 by a predetermined time T_D2, and thereby produces a clock signal CLKD2. Clock signal CLKD2 is supplied to clock terminal C of flip-flop 38 instead of clock signal CLKD1.

In this multiplexer, the data output timing of flip-flop 38 is delayed by T_D2 so that the timing margin from flip-flops 1–4 to flip-flop 38 is increased. Therefore, fmax2 can be increased to fmax2' expressed by the following formula (7):

$$\text{fmax2'}=1/(T\_\text{DFF}+T\_\text{sel}+T\_\text{setup}-T\_\text{D2})<T\_\text{setup} \qquad (7)$$

where a relationship of (TD$_{13}$2<T_DFF+T_sel) is present.

In many cases, the above multiplexer establishes a relationship of (fmax5<fmax4'≈fmax3'), and the maximum operation frequency is restricted to fmax5, although these facts depend on the performance of transistors forming the circuit. However, fmax5 is larger than fmax2, and the maximum operation frequency is higher than that of multiplexer shown in FIG. 4.

Fifth Embodiment

Figure 6:
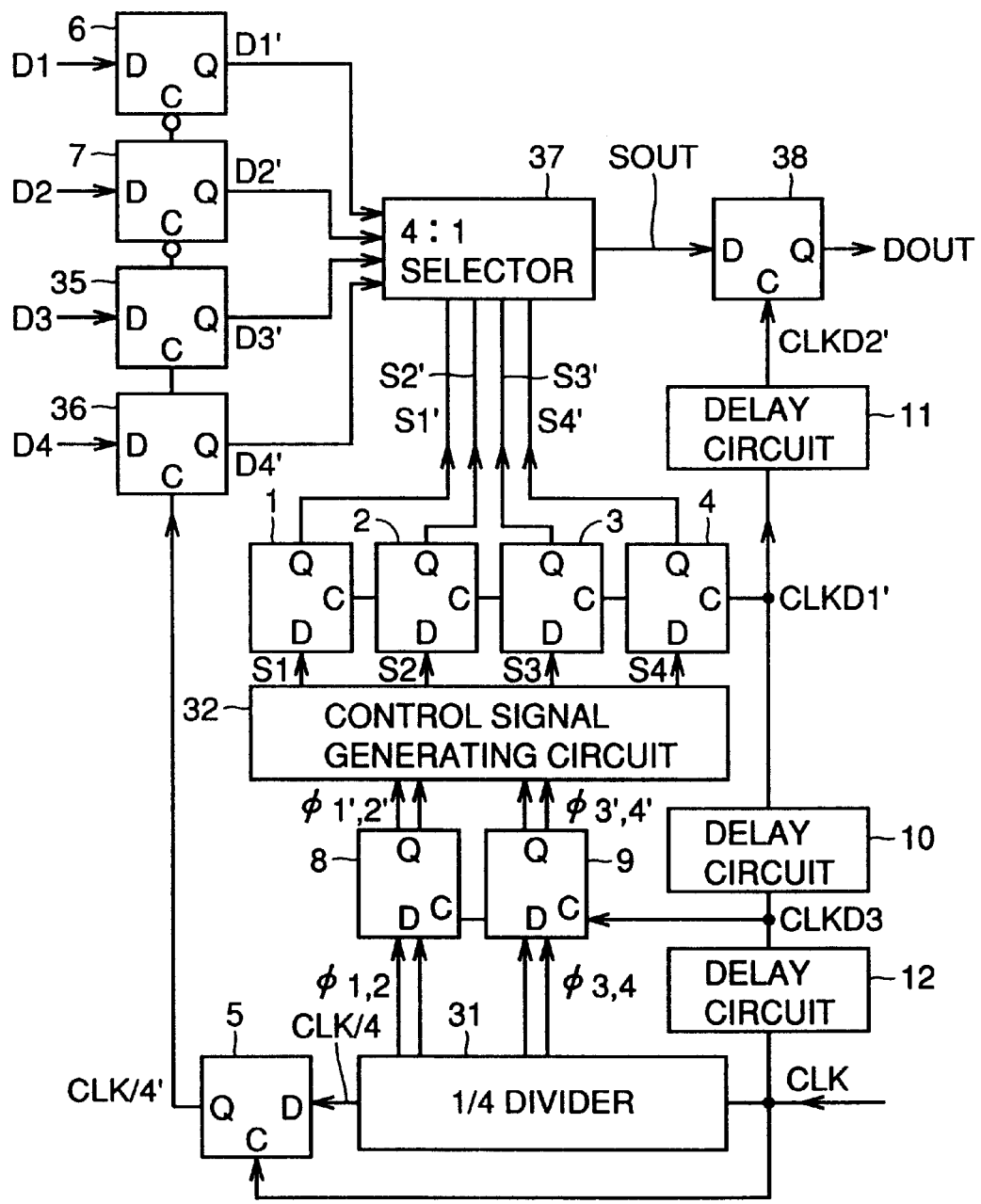
FIG. 6 is a block diagram showing a structure of a multiplexer according to a fifth embodiment of the invention.

FIG. 6 is a block diagram showing a structure of a multiplexer according to a fifth embodiment of the invention. The multiplexer shown in FIG. 6 differs from the multiplexer shown in FIG. 5 in that a delay circuit 12 is additionally employed.

Delay circuit 12 delays clock signal CLK by a predetermined time T_D3 and thereby produces a clock signal CLKD3, which is applied to clock terminals C of flip-flops 8 and 9 as well as delay circuit 10.

Delay circuit 10 delays clock signal CLKD3 by a predetermined time T_D1, and thereby produces a clock signal CLKD1', which is applied to clock terminals C of flip-flops 1–4 as well as delay circuit 11. Delay circuit 11 delays clock signal CLKD1' by a predetermined time T_D2, and thereby produces a clock signal CLKD2', which is applied to clock terminal C of flip-flop 38.

In this multiplexer, the data output timing of flip-flops 8 and 9 is delayed by T_D3 for increasing the timing margin before and after quarter divider 31 so that fmax5 can be increased to fmax5' expressed by the following formula (8).

$$\text{fmax5'}=1/(2T\_\text{DFF}+T\_\text{setup}-T\_\text{D3})<1/T\_\text{setup} \qquad (8)$$

where a relationship of (TD_3<2T_DFF) is present.

In this manner, maximum operation frequency fmax of the multiplexer can be close to 1/T_setup.

Sixth Embodiment

In a multiplexer for multiple bits, a plurality of selectors may be connected in a tree-like form. The purpose of this is to perform gradual up-converting of slow data signals into fast data signals. For example, four-to-one selectors may be arranged in two stages, whereby a 16-to-1 multiplexer is formed. In this case, a circuit near the input of data operates slowly, and therefore can operate with a sufficient margin of speed. However, a circuit near the output of data operates fast, and therefore cannot operate with an appropriate margin of speed. The sixth embodiment overcomes this disadvantage.

Figure 7:
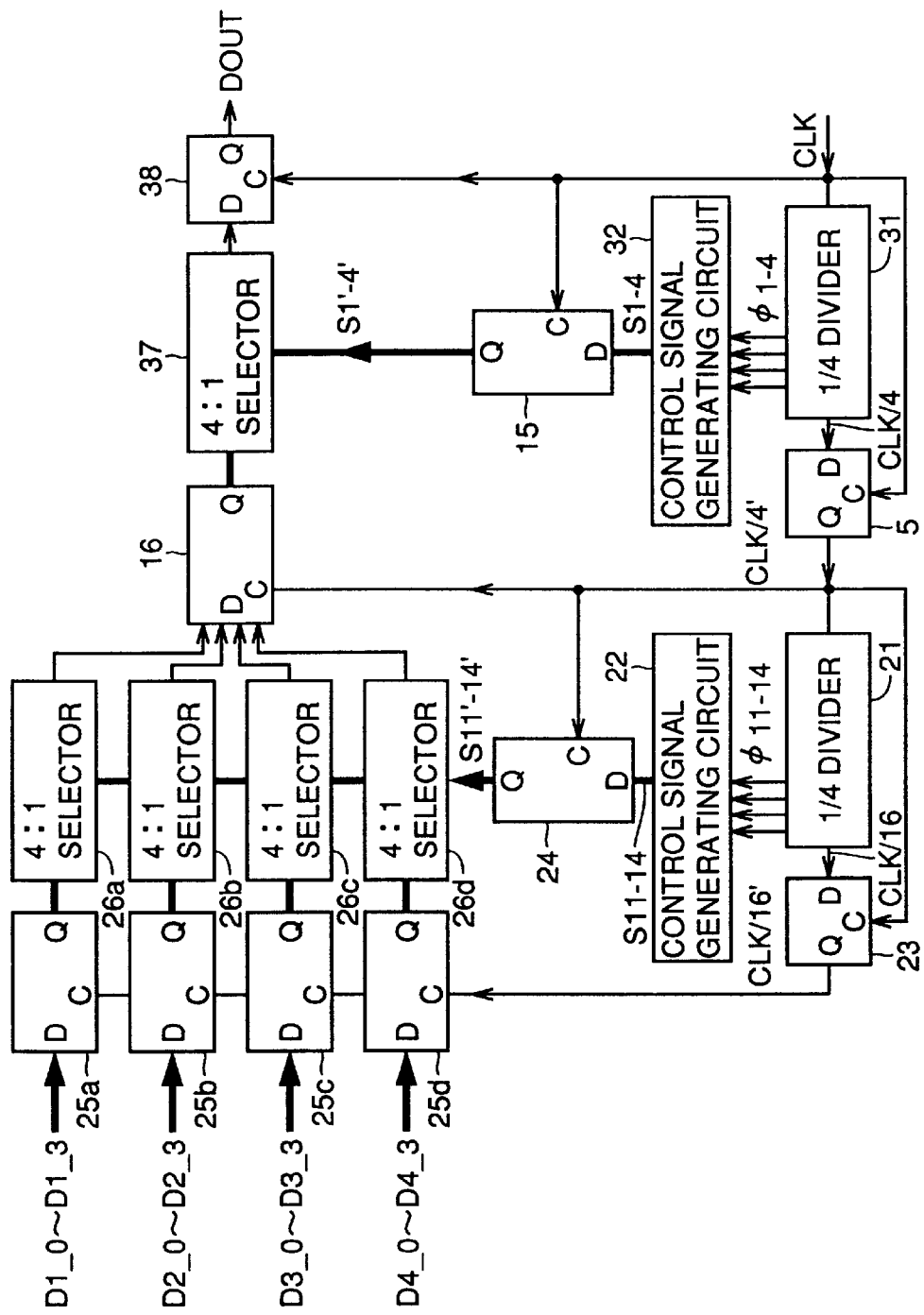
FIG. 7 is a block diagram showing a structure of a multiplexer according to a sixth embodiment of the invention.

FIG. 7 is a block diagram showing a structure of a multiplexer according to the sixth embodiment of the invention. Referring to FIG. 7, the multiplexer differs from the multiplexer shown in FIG. 1 in that the multiplexer in FIG. 7 is provided with a quarter divider 21, a control signal generating circuit 22, a D-flip-flop 23, four-bit D-flip-flops 24 and 25a–25d, and four-to-one selectors 26a–26d. A four-bit D-flip-flop 15 represents flip-flops 1–4 in FIG. 1, and a four-bit D-flip-flop 16 represents flip-flops 6, 7, 35 and 36 in FIG. 1. Output clock signal CLK/4' of flip-flop 5 is applied to quarter divider 21, and is also applied to clock terminals C of flip-flops 16, 23 and 24.

Quarter divider 21 issues to flip-flop 23 a clock signal CLK/16, which has a frequency equal to a quarter of that of clock signal CLK/4' sent from flip-flop 5. Flip-flop 23 issues the level of clock signal CLK/16, as it is, in response to the falling edge of clock signal CLK/4'. Output clock signal CLK/16' of flip-flop 23 is applied to clock terminals C of flip-flops 25a–25d.

Quarter divider 21 produces clock signals φ11–φ14 of four phases, which have the same frequencies as clock signal CLK/16 and are shifted in phase by a quarter of the period from each other, and applies such clock signals φ11–φ14 to control signal generating circuit 22. Control signal generating circuit 22 produces control signals S11–S14, which have the same frequencies as clock signal CLK/16 and successively attain "H" level at every quarter of the period, and applies such control signals S11–S14 to flip-flop 24. Flip-flop 24 issues the levels of control signals S11–S14, as they are, in response to the falling edge of clock signal CLK/4'. Output signals S1'–S14' of flip-flop 24 are applied to four-to-one selectors 26a–26d, respectively.

Four-bit D-flip-flops 25a–25d receive parallel data D1_0–D1_3, ..., D4_0–D4 3, respectively, and apply the received data to four-to-one selectors 26a–26d in response to the falling edge of clock signal CLK/16'.

Four-to-one selectors 26a–26d successively issue data D1_0–D4_0, ..., D1_3–D4_3 in response to control signals φ11'–φ14', respectively. The output data of four-to-one selectors 26a–26d is applied to four-bit D-flip-flop 16. Structures other than the above are the same as those of the multiplexer in FIG. 1, and therefore will not be described.

Operation of the multiplexer shown in FIG. 7 will now be briefly described. Quarter divider 31 produces clock signals φ1–φ4 and CLK/4 each having a period which is four times larger than that of clock signal CLK. Control signal generating circuit 32 produces control signals S1–S4, which have periods four times larger than that of clock signal CLK, and successively attain "H" level at every clock cycle. Control signals S1–S4 are applied to four-to-one selector 37 in accordance with timing adjusted by flip-flop 15.

Quarter divider 21 produces clock signals 11–14 and CLK/16 each having a period which is four times larger than that of clock signal CLK/4'. Control signal generating circuit 22 produces control signals S11–S14 which have periods four times larger than that of clock signal CLK/4, and successively attain "H" level at every four clock cycles. Control signals S11–S14 are applied to four-to-one selectors 26a–26d in accordance with the timing adjusted by flip-flop 24.

Parallel datas D1_0–D1_3 of 4 bits is converted into serial data D1_0–D1_3 of 4 bits by flip-flop 25a, four-to-one selector 26a and flip-flop 16, and is applied to a first input node of four-to-one selector 37.

Parallel datas D2_0–D2_3 of 4 bits is converted into serial data D2_0–D2_3 of 4 bits by flip-flop 25b, four-to-one selector 26b and flip-flop 16, and is applied to a second input node of four-to-one selector 37.

Parallel datas D3_0–D3_3 of 4 bits is converted into serial data D3_0–D3_3 of 4 bits by flip-flop 25c, four-to-one selector 26c and flip-flop 16, and is applied to a third input node of four-to-one selector 37.

Parallel datas D4_0–D4_3 of 4 bits is converted into serial data D4_0–D4_3 of 4 bits by flip-flop 25d, four-to-one selector 26d and flip-flop 16, and is applied to a fourth input node of four-to-one selector 37.

Parallel datas D1_0–D4_0 of 4 bits is converted into serial data D1_0–D4_0 of 4 bits by four-to-one selector 37, and is applied to flip-flop 38. Likewise, four-bit parallel datas D1_1–D4_1, ..., D1_3–D4_3 are converted into four-bit serial data D1_1–D4_1, ..., D1_3–D4_3, respectively, and are applied to flip-flop 38. Serial data D1_0–D4_3 of 16 bits thus produced are issued in accordance with the timing adjusted by flip-flop 38.

In this embodiment, the operation speed of multiplexer can be increased similarly to the first embodiment.

In this embodiment, the circuit of the first embodiment is applied to a fast-operating portion (circuit portion on the light side in FIG. 7) which operates in synchronization with clock signal CLK, and is also applied to a slow-operating portion (circuit portion on the left side in FIG. 7) which operates in synchronization with clock signal CLK/4'. Naturally, each of the left and right portions may employ the circuit of any one of the second to fifth embodiments.

In the case where the fast-operating portion may operate without an appropriate margin of operation speed, but the slow-operating portion can operate with an appropriate margin of operation speed, only the fast-operating portion may employ the circuit of any one of the first to fifth embodiments.

Figure 8:
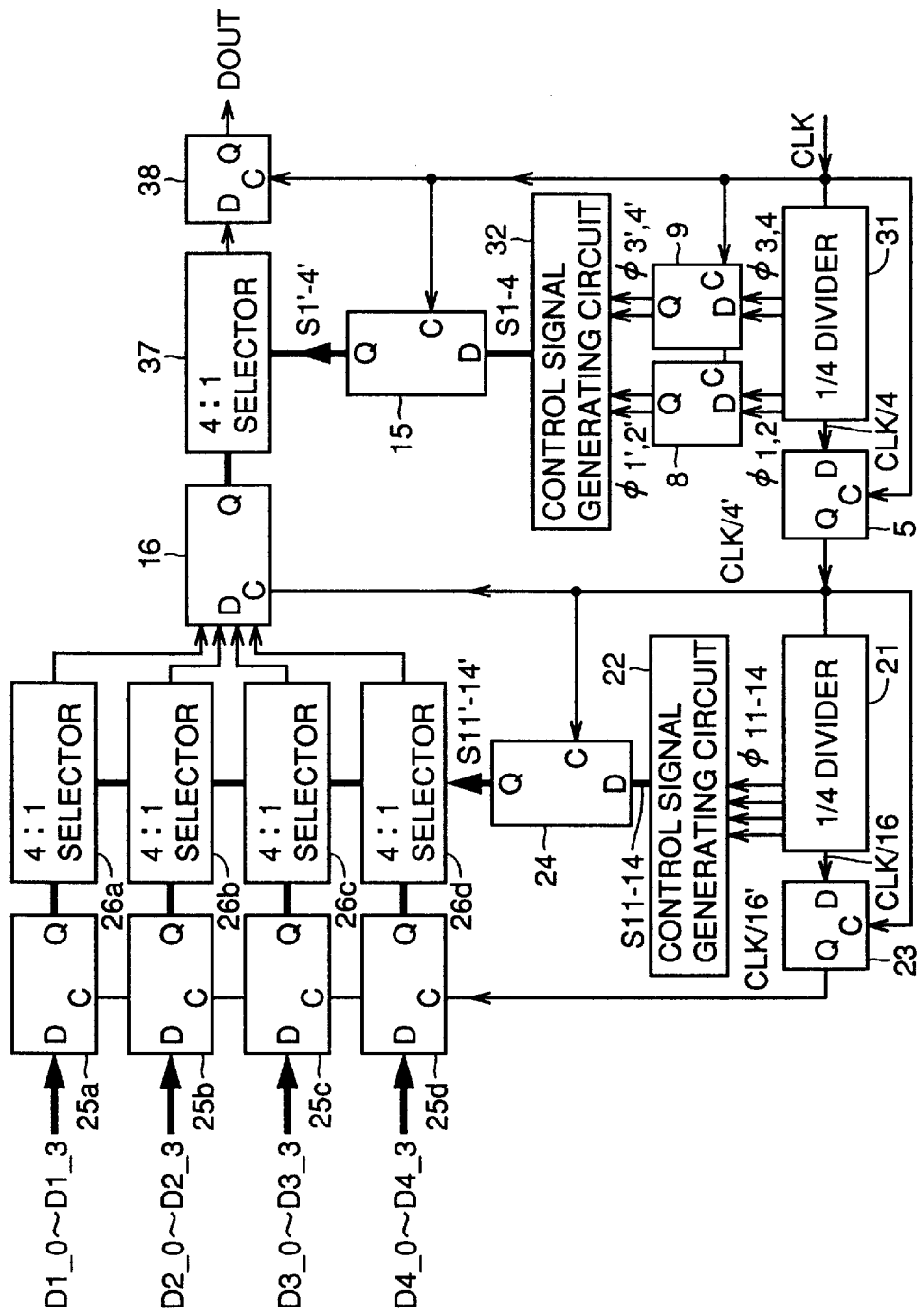
FIG. 8 is a block diagram showing a modification of the sixth embodiment.

As shown in FIG. 8, the slow-operating portion may employ the circuit of the first embodiment, and the fast-operating portion may employ the circuit of the second embodiment. Likewise, the slow- and fast-operating portions may employ the circuits of the first and third, first and fourth, second and third, second and fourth, third and fourth, third and sixth, or fourth and fifth embodiments, respectively. Thereby, the operation speed can be increased while suppressing increase in number of transistors as well as increase in power consumption.

In the above embodiment, four-to-one selectors are arranged in two stages, respectively. Naturally, m-to-1 selectors may be arranged in n stages, where m and n are integers larger than 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multiplexer for converting parallel data signals of M bits (M being an integer larger than 1) into a serial data signal of M bits in synchronization with a clock signal, comprising:

a signal generating circuit for generating control signals of M phases each having a period M times larger than that of said clock signal, and being shifted in phase from each other by (1/M) of said period;

a first holding circuit for temporarily holding said control signals of M phases issued from said signal generating circuit, and issuing said control signals in synchronization with said clock signal;

a select circuit for successively selecting said parallel data signals of M bits bit by bit in response to the control signals of M phases issued from said first holding circuit, and producing said M-bit serial data signal by passing each of the selected data signals; and a second holding circuit for temporarily holding each of the data signals issued from said select circuit, and thereafter issuing said data signal in synchronization with said clock signal.

2. The multiplexer according to claim 1, wherein said signal generating circuit includes:

an internal clock generating circuit for generating internal clock signals of M phases each having a period M times larger than that of said clock signal, and being shifted in phase by (1/M) of the period from each other, and a logic circuit for producing said control signals of M phases based on said internal clock signals of M phases generated by said internal clock generating circuit; and each of said control signals of M phases is at a first level during (1/M) of the period, and is at a second level during (M−1)/M of the period.

3. The multiplexer according to claim 2, further comprising:

a third holding circuit for temporarily holding the internal clock signals of M phase generated from said internal clock generating circuit, and thereafter issuing the internal clock signals to said logic circuit in synchronization with said clock signal.

4. The multiplexer according to claim 1, further comprising:

a first delay circuit for delaying said clock signal by a predetermined first delay time, said first and second holding circuits operating in synchronization with the clock signal delayed by said first delay circuit.

5. The multiplexer according to claim 1, further comprising:

a first delay circuit for delaying said clock signal by a predetermined first delay time; and a second delay circuit for further delaying, by a predetermined second delay time, said clock signal delayed by said first delay circuit, said first holding circuit operating in synchronization with the clock signal delayed by said first delay circuit, and said second holding circuit operating in synchronization with the clock signal delayed by said first and second delay circuits.

6. The multiplexer according to claim 3, further comprising:

a first delay circuit for delaying said clock signal by a predetermined first delay time;

a second delay circuit for further delaying, by a predetermined second delay time, said clock signal delayed by said first delay circuit; and a third delay circuit for further delaying, by a predetermined third delay time, said clock signal delayed by said first and second delay circuits, said third holding circuit operating in synchronization with the clock signal delayed by said first delay circuit, said first holding circuit operating in synchronization with the clock signal delayed by said first and second delay circuits, and said second holding circuit operating in synchronization with the clock signal delayed by said first, second and third delay circuits.

7. A multiplexer for converting parallel data signals of (M×N) bits (M and N being integers larger than one) into a serial data signal of (M×N) bits in synchronization with a clock signal, comprising:

a first signal converting circuit for converting said parallel data signals of (M×N) bits into first to Mth parallel data signal columns each including a serial data signal of N bits; and a second signal converting circuit for converting said first to Mth parallel data signal columns into said serial data signal of (M×N) bits, said second signal converting circuit including:

a first signal generating circuit for producing first control signals of M phases each having a period M times larger than that of said clock signal, and being shifted in phase from each other by (1/M) of said period, a first holding circuit for temporarily holding said first control signals of M phases issued from said first signal generating circuit, and thereafter issuing said first control signals in synchronization with said clock signal, a first select circuit for successively selecting one bit in each of said first to Mth parallel data signal columns in response to the first control signals of M phases issued from said first holding circuit, and producing said serial data signal of (M×N) bits by passing each of the selected data signals, and a second holding circuit for temporarily holding each of the data signals issued from said first select circuit, and thereafter issuing said data signal in synchronization with said clock signal.

8. The multiplexer according to claim 7, wherein said first signal generating circuit includes:
   an internal clock generating circuit for generating internal clock signals of M phases each having a period M times larger than that of said clock signal, and being shifted in phase by (1/M) of the period from each other, and
   a logic circuit for producing said first control signals of M phases based on said internal clock signals of M phases generated by said internal dock generating circuit; and
   each of said first control signals of M phases is at a first level during (1/M) of the period, and is at a second level during (M−1)/M of the period.

9. The multiplexer according to claim 8, further comprising:
   a third holding circuit for temporarily holding the internal clock signals of M phase generated from said internal clock generating circuit, and thereafter issuing said internal clock signals to said logic circuit in synchronization with said clock signal.

10. The multiplexer according to claim 9, wherein the internal clock signal of one phase among said internal clock signals of M phases is selected as a reference clock signal; said first signal converting circuit includes:
   a second signal generating circuit for producing second control signals of N phases each having a period N times larger than that of said reference clock signal, and being shifted in phase by (1/N) of the period from each other,
   a fourth holding circuit for temporarily holding said second control signals of N phases issued from said second signal generating circuit, and thereafter issuing said second control signals in synchronization with said reference clock signal,
   a second select circuit for successively selecting M bits from said parallel data signals of (M×N) bits in response to said second control signals of N phases issued from said fourth holding circuit, and producing said first to Mth parallel data signal columns by passing in parallel the selected data signals of M bits at a time, and
   a fifth holding circuit for temporarily holding the data signals of M bits issued from said second select circuit at a time, and thereafter issuing said second signal converting circuit in synchronization with said reference clock signal.

* * * * *